United States Patent
van den Herik

(12) 
(10) Patent No.: US 6,667,588 B1
(45) Date of Patent: Dec. 23, 2003

(54) MULTI STANDARD TELEVISION DISPLAY

(75) Inventor: Florus Bernardus van den Herik, Oosterhout (NL)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 10/371,097

(22) Filed: Feb. 21, 2003

Related U.S. Application Data

(60) Provisional application No. 60/369,284, filed on Apr. 2, 2002.

(51) Int. Cl.$^7$ ................................................. G09G 1/04
(52) U.S. Cl. .................... 315/370; 315/371; 315/411; 315/408; 348/511
(58) Field of Search ............................... 315/364, 370, 315/371, 387, 399, 382.1, 403, 408, 411; 348/511, 531, 532, 543, 542, 555

(56) References Cited

U.S. PATENT DOCUMENTS

| | | | |
|---|---|---|---|
| 4,677,350 A | * 6/1987 | Wharton et al. | 315/371 |
| 4,761,586 A | * 8/1988 | Wharton | 315/408 |
| 6,118,486 A | * 9/2000 | Reitmeier | 348/441 |
| 6,208,093 B1 | * 3/2001 | Truskalo | 315/371 |
| 6,229,401 B1 | * 5/2001 | Wilber | 331/20 |

* cited by examiner

Primary Examiner—Haissa Philogene
(74) Attorney, Agent, or Firm—Joseph S. Triopli; Harvey D. Fried; Francis A. Davenport

(57) ABSTRACT

An image display is operable with video signals having a plurality of scanning frequencies and comprises a cathode ray tube for the display of ones of the video signals. A deflection coil is mounted on the cathode ray tube and a horizontal deflection amplifier is coupled to the deflection coil and generates a deflection current therein. A plurality of retrace capacitors are controllably coupled to the horizontal deflection amplifier in response to a selected scanning frequency to maintain a substantially constant active picture display area with the ones of the video signals having the plurality of scanning frequencies.

7 Claims, 4 Drawing Sheets

| SYSTEM | SAMPLES PER ACTIVE LINE | TOTAL SAMPLES PER LINE | ACTIVE LINES PER FRAME | TOTAL LINES PER FRAME | FRAME RATE Hz | SCANNING FORMAT | SAMPLING FREQ. |
|---|---|---|---|---|---|---|---|
| 1 | 1920 x 1080/30/2:1 | 1920 | 2200 | 1080 | 1125 | 30 | 2 : 1 INTERLACE | 74.25 MHz |
| 2 | 1920 x 1080/25/2:1 | 1920 | 2640 | 1080 | 1125 | 25 | 2 : 1 INTERLACE | 74.25 MHz |

TABLE 1

*Fig 1*

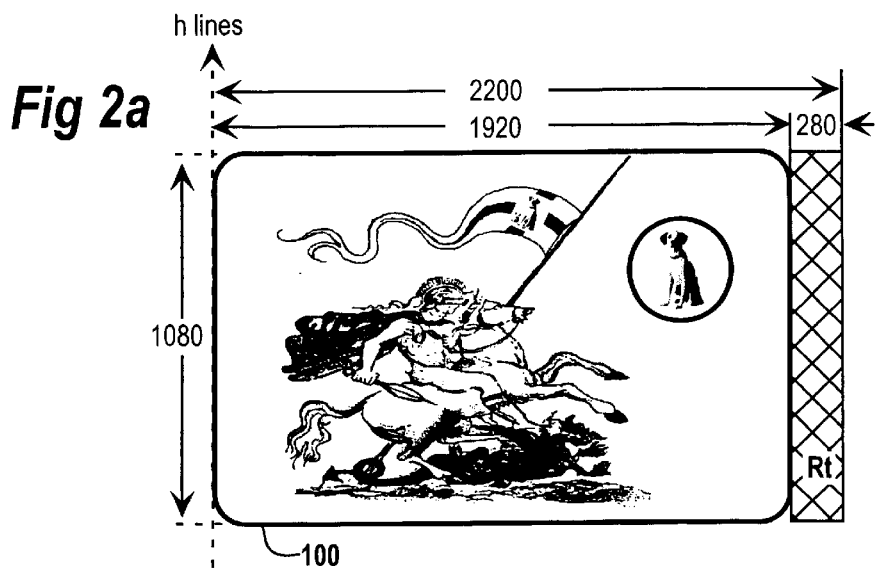
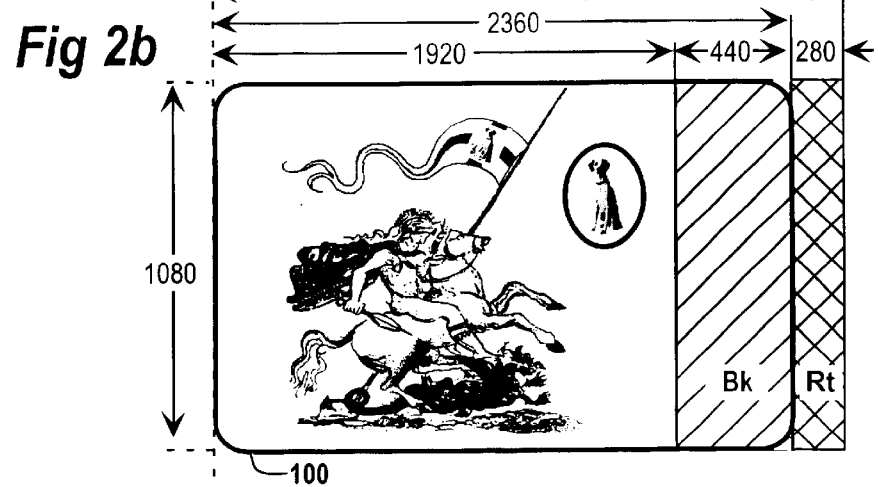
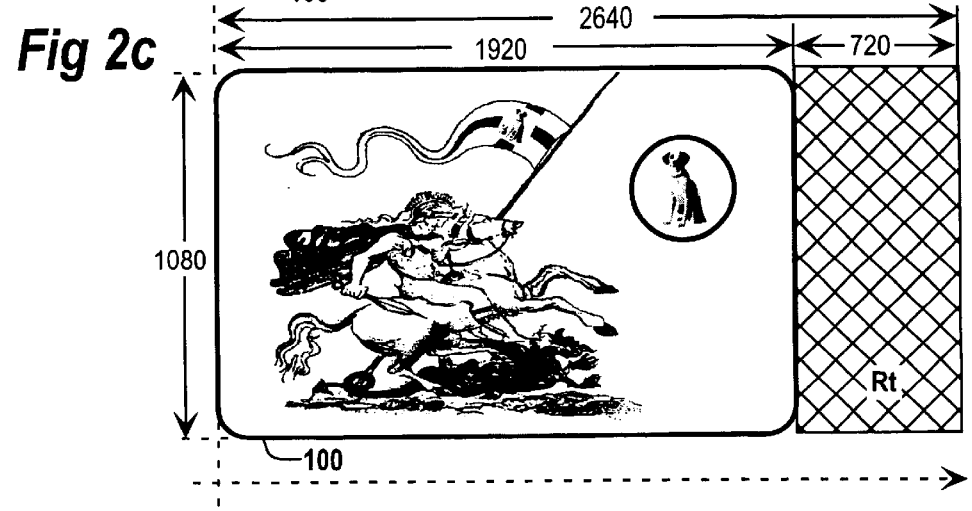

MULTI STANDARD TELEVISION DISPLAY

This Application claims benefit of Prov. No. 60/369,284 filed Apr. 2, 2002.

This invention relates to a video display and in particular to a cathode ray tube display operable in accordance multiple high definition standards.

BACK GROUND OF THE INVENTION

The Society of Motion Picture and Television Engineers (SMPTE), Advanced Television Standards Committee (ATSC) and the Federal Communications Committee (FCC) formulated and adopted standards for the United States which describe both standard definition (SD) and high definition (HD) television services. The resulting ATSC document (Doc. A/53B) defines various video signal parameters and a wide variety of scanning standards. For example in a particular high definition standard, published by the SMPTE as 274M-1998, parameters are defined for eleven varieties of scanning standards each having the same constant image format (CIF) of 1920 active samples in a horizontal direction and 1080 active lines vertically per frame. Exemplary parameters abstracted from SMPTE 274M-1998 are shown in Table 1 of FIG. 1. In addition each frame has the same total number of lines regardless of the frame rate. Although standard SMPTE 274M-1998 defines identical image formats with nominally identical clock frequencies, eleven standard varieties result as a consequence of differing frame rates and progressive or interlaced image construction.

In SMPTE standard 296M-2001 parameters are published which define a family of eight progressively scanned standards having a constant image format of 1280 active pixels horizontally by 720 active lines vertically. In the description that follows, analog video display consequences are explained, and inventive solutions discussed with reference to the exemplary parameters of Table 1. However, substantially similar analog display consequences result with signals defined by SMPTE 296M-2001 and advantageously, the inventive solutions which follow are equally applicable to standards defined by SMPTE 296M-2001.

The standardized requirement of SMPTE 274M-1998 for constant image formats with identical clock frequencies results in a nominally constant time period for image readout and display. Furthermore with each frame constructed from identical numbers of lines, the differences in frame frequencies between, for example 25 Hz and 30 Hz, must be accommodated by differences in blanking periods. For example, if a 60 Hz interlaced standard is considered as shown at line 1 of Table 1, FIG. 1, the duration of an active frame is 1920×1/74.25 MHz×1080, or approximately 27.9272 milliseconds. The total duration of one frame of a 60 Hz interlaced standard is 33.3333 milliseconds thus a period of 33.3333−27.9272, or approximately 5.4061 milliseconds is available for synchronization and blanking. If a 50 Hz interlaced standard is considered, line 2 of Table 1, FIG. 1, the duration of an active frame is 1920×1/74.25 MHz×1080, or approximately 27.9272 milliseconds however total duration of one frame of a 50 Hz interlaced standard is 40.0000 milliseconds, thus a period of 40.0000−27.9272, or 15.0728 milliseconds is available for synchronization and blanking. Since the numbers of active lines and total lines per frame, 1080, 1125 respectively, are the same for each of the eleven standards defined by SMPTE 274M, the difference in horizontal and frame duration between 50 Hz and 60 Hz signals can only be accommodated by modification or variation of horizontal blanking periods.

This blanking or non-active picture time accommodation is apparent when the total number of samples per line is considered. For example, an interlaced 60 Hz, 30 frame per second standard has 1920 active pixels or samples and a total pixel count of 2200, which provides 280 clock periods for horizontal blanking and synchronization. However, an interlaced 50 Hz, 25 frame per second standard has 1920 active pixels and a total horizontal pixel count of 2460, thus 720 clock periods are available for horizontal blanking and synchronization. For example if similar intervals are required by the display circuitry to perform blanking and synchronization functions, then an additional 440 clock periods are available per line. Thus with 440 extra samples or clock periods per line, the 25 Hz standard can be constructed with identical active picture areas to that of the 60 Hz standard but with different horizontal and frame rates. For example, with a total number of 1125 lines per frame and 440 additional clock samples (1/74.25 MHz) per line, an additional period of approximately 6.6666 milliseconds elapses, which when added to the nominal period of a 30 Hz frame rate signal to yields an identical image format but with a 25 Hz frame rate.

In an exemplary video display, or television camera view finder, operable at various of the standards defined by SMPTE 274M it is conventional to control the deflection amplitude and maintain the same retrace or fly-back time during operation in each standard. However, such display design constraints result in active picture areas of differing sizes when selecting between 30 Hz and 25 Hz frame rate standards. If an exemplary 30 Hz image is arranged to nominally fill the viewable tube face then active picture area of a 25 Hz image will be presented with reduced width. In fact all 1920 active pixels of the 25 Hz frame rate image will be displayed adjacent to 440 black pixels or blanking samples. The visual effect is that a 25 Hz active area is displayed with about 82% of the width of a 30 Hz image, even though SMPTE 274M standard provides for a constant image format.

Clearly when operating at a 25 Hz frame rate there are various remedies that can be applied to restore the compressed display image width. For example the active portion of each line can be electronically stretched to eliminate the 440 blanking pixels. Such processing though not technologically difficult represents a standards specific cost increment for the display, and additional power dissipation which is a specific concern when battery powered operation is considered. Similarly the horizontal deflection amplitude of the display can be increased such that the scanning electron beam is deflected to each tube edge in the period of the active video, rather than in the duration of the total line pixel count less retrace time. Such an increase in deflection amplitude results in additional power dissipation which also shortens battery operation time.

It is clearly desirable that an exemplary video display, operable at various of the HD standards, is capable of providing active picture displays of substantially similar sizes without aspect ration distortion, and without significantly increased material cost or power dissipation.

SUMMARY OF THE INVENTION

In an inventive arrangement a cathode ray tube display is operable to display images having identical active image pixel counts and a plurality of different scanning frequencies. The inventive arrangement comprises a deflection arrangement forming a raster to display the active image pixels on the cathode ray tube. A power supply for the deflection arrangement is controlled to vary in a manner which facilitates the display of substantially all the active image pixels with a substantially similar picture width when operating at different ones of the plurality of scanning frequencies.

In a further advantageous arrangement a video display with a cathode ray tube is operable at a plurality of scanning frequencies. The video display comprises a deflection arrangement forming a raster of substantially constant width on said cathode ray tube when operating at ones of the plurality of scanning frequencies. A power supply is coupled to the deflection arrangement and is controlled to maintain a substantially similar deflection current generated by the deflection arrangement when operating at each one of said plurality of scanning frequencies.

An inventive method for the display of raster scanned images having a plurality of scanning frequencies, the method comprises selecting a retrace time for raster scanning in accordance with each one of the plurality of scanning frequencies; and, maintaining a substantially constant active picture width on the display for images having ones of the plurality of scanning frequencies.

In a further inventive method for raster scanned display of images having a plurality of scanning frequencies. The method comprises selecting a retrace time for the raster scanning in accordance with each one of the plurality of scanning frequencies; and, controlling deflection current for the raster scanned display to be substantially equal in each one of the plurality of scanning frequencies.

BRIEF DESCRIPTION OF THE DRAWINGS

FIG. 1 is a table listing various scanning parameters defined by SMPTE standard 274M.

FIG. 2a depicts the display of a image in accordance with a first scanning standard.

FIG. 2b depicts the display of the same image as FIG. 2a in accordance with a second scanning standard.

FIG. 2c depicts the use of an inventive arrangement applied to the display of the second scanning standard depicted in FIG. 2b FIGS. 3a 3b and 3c depict various waveforms which correspond to FIGS. 2a, 2b and 2b respectively.

DETAILED DESCRIPTION

The display differences between constant image format (CIF) images having different frame rates is illustrated in FIGS. 2a and 2b which diagrammatically shows an image presented on a 16:9 aspect ratio cathode ray tube face 100. In each figure the tube face is dimensioned in terms of pixels horizontally and lines vertically. FIG. 2a illustrates an image generated in accordance with an interlaced 60 Hz standard having 1920 active pixels horizontally and 1080 active lines vertically. The image is blanked and horizontal scan retrace or fly-back occurs within a cross hatched area Rt. Horizontal retrace has a duration, derived from the standard, of approximately 280 pixels and is depicted for illustrative purposive occurring beyond the right edge of the image display. The image is displayed without aspect ratio distortion as indicated by the circular image content.

FIG. 2b illustrates an image generated in accordance with an interlaced 50 Hz standard and having 1920 active pixels horizontally and 1080 active lines vertically. The same image and cathode ray tube face as FIG. 2a are depicted in FIG. 2b which is dimensioned, as FIG. 2a, to show pixel parameters of the specific standard used. Since the image was formed with a constant image format, the active display content is contained in an area of 1920 pixels×1080 lines. However, the aspect ratio of displayed image has suffered horizontal geometric distortion which results from a width reduction of the active picture content, as indicated by the elliptical or ovoid representation of the circle. In addition to the image, tube face 100 also displays a band of blanking Bk with a derived duration of 440 pixels when deflection retrace time is maintained the same as that of FIG. 2a. Although all 1920 active pixels are displayed, the display of image blanking represents a change in aspect ratio caused by the reduction in active picture width of about 19%. Clearly such an image presentation can impair the efficient utilization of the display particularly when used for image capture by a camera person.

FIG. 2c represents the same image and scanning standard as FIG. 2b. However, as a consequence of an inventive deflection arrangement the active display content of 1920 pixels×1080 lines, now fills screen 100, eliminating both the blanking bar Bk and horizontal image compression or geometric distortion and thus restores the correct aspect ratio. FIG. 2c includes a cross hatched band Rt which represents a horizontal retrace period. This retrace period is extended and has a derived duration of 720 pixels which represents the difference between the total line duration and the active picture duration in pixels.

Figure 3A:
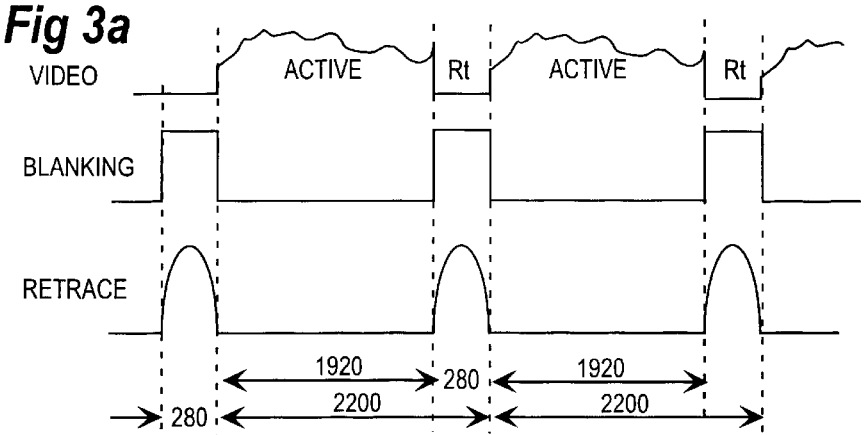
Figure 3B:
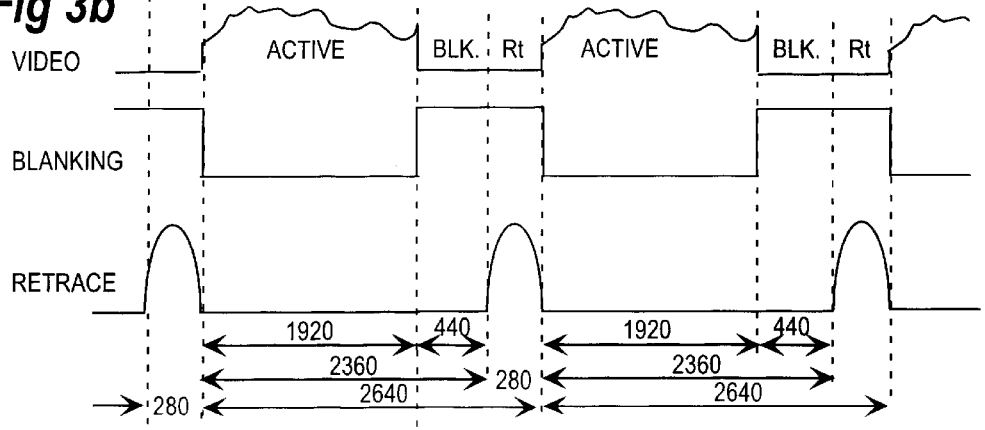
Figure 3C:
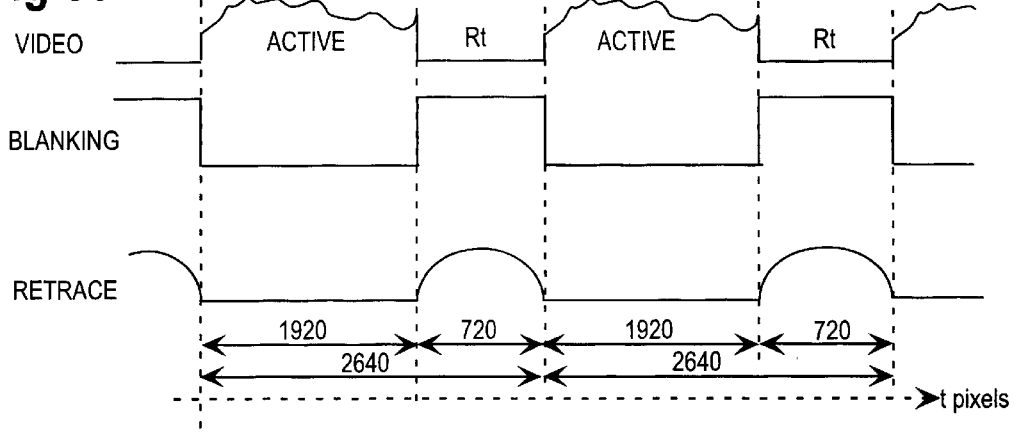

FIGS. 3a, 3b and 3c depict various waveforms which correspond with the displayed images of FIGS. 2a 2b and 2c respectively. FIG. 3a corresponds to the displayed image of FIG. 2a and shows a video signal with an active duration of 1920 pixels (or samples of 74.25 MHz clock) and blanking and retrace signals with a period of 280 pixels. FIG. 3b corresponds to the displayed image of FIG. 2b, and by way of example, the depiction in FIG. 3b is initiated in synchronism with that of FIG. 3a. Thus the initial retrace pulses and active video signals are shown to be time coincident, that is aligned vertically in the figures. However, because the standardized signal shown in FIG. 3b has a lower horizontal frequency, or greater total pixel count per line than that of FIG. 3a, the depicted waveforms rapidly loose synchronism. In FIG. 3b active video has a duration of 1920 pixels with the remaining horizontal duration of 720 pixels divided between blanking time and retrace time. Thus if the retrace interval is chosen, as is common practice, to be the same as that depicted in FIG. 3a, namely 280 pixels, then the remaining interval of 440 pixels will be displayed on the CRT face as blanking or black level stripe down the right display edge. Clearly processing can arrange that the 440 blanking pixels are symmetrically distributed about the active image, however the problems noted previously still remain.

FIG. 3c shows waveforms in accordance with inventive deflection arrangements which will be described, and which correspond to the display image of FIG. 2c. As with FIG. 3b the initial active video signal and retrace pulse are shown to be coincident in the three depictions (3a, 3b, 3c), however, FIGS. 3b and 3c remain in synchronism. The difference between FIGS. 3b and 3c is that in FIG. 3c scanning retrace is initiated by a horizontal blanking signal rather than the more usual horizontal drive signal. By initiating retrace from horizontal blanking rather than horizontal drive repositions the displayed blanking bar Bk, and in addition, the retrace pulse width is advantageously extended to have a duration of 720 pixels. In this way by initiating retrace earlier and lengthening the retrace interval the previously displayed blanking interval Bk, shown in FIG. 3b, occurs during the retrace interval which eliminates the black edge stripe from the display. In addition the aspect ratio of the displayed image is restored to unity because the active video image content now occupies the total horizontal trace duration.

However, although the black tripe is eliminated and the aspect ratio is restored, the displayed image may not necessarily fill the tube face horizontally because of the change in retrace pulse duration. Thus in a further inventive arrangement the deflection amplitude is controlled to ensure that the CIF signal with the lower scanning frequency fills the tube face horizontally. It can be appreciated that the inventive alteration of the retrace pulse width or duration can result in significant changes to any power supplies derived from retrace pulse energy. Thus the CRT high voltage or EHT can be generated by a separate switching supply (which is not shown).

Figure 4:
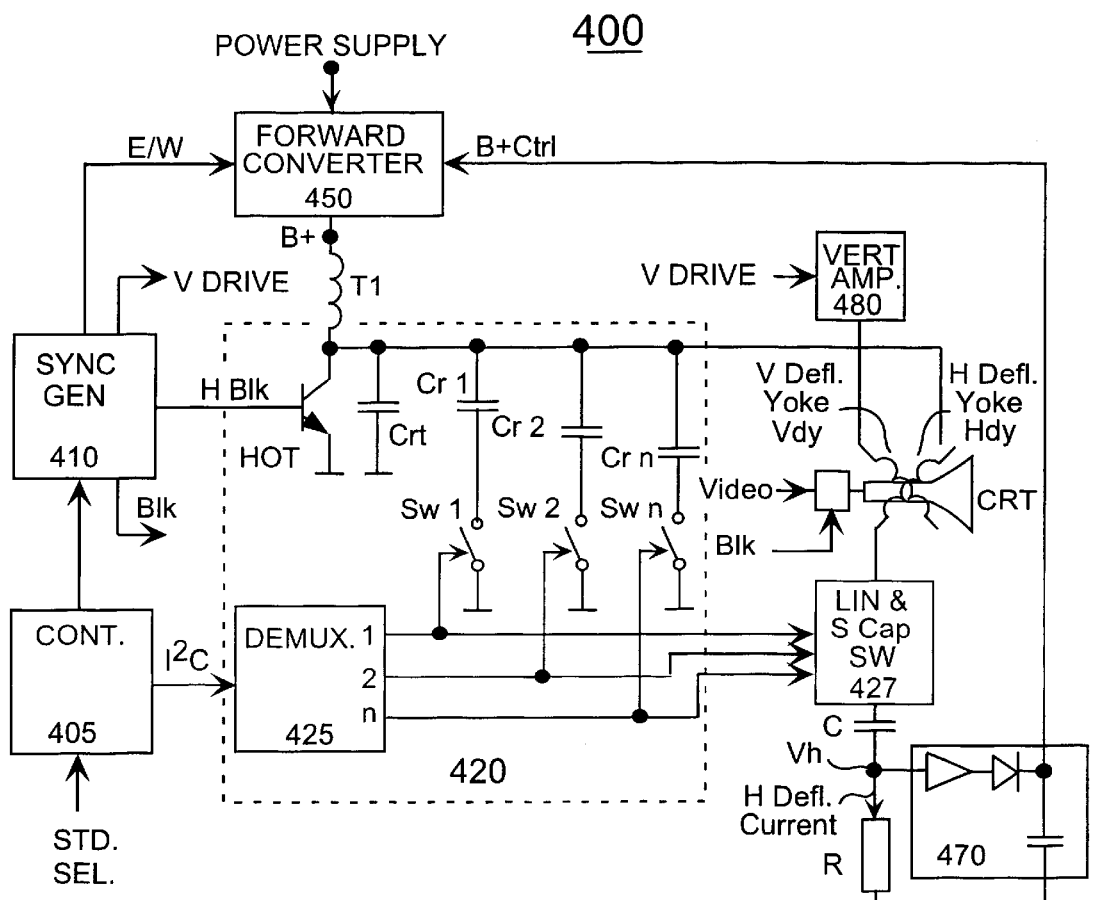
FIG. 4 is a block diagram showing the inventive arrangement for displaying the images and waveforms depicted in FIGS. 2c and 3c.

The inventive deflection arrangements described previously are shown in an exemplary display 400 depicted by a block diagram in FIG. 4. Display 400 is operable in accordance with a plurality of high definition scanning standards which provide the exemplary display images and waveforms of FIGS. 2a–2c and 3a–3c respectively. The block diagram of FIG. 4 shows a cathode ray tube display (CRT) with horizontal and vertical deflection generators coupled deflection yokes which form scanned rasters on the CRT. In a first inventive arrangement, horizontal deflection retrace duration is controllably determined by circuitry of block 420. Horizontal deflection retrace duration is selected by decoding TV standards determining data output from controller 405 and coupled via data bus I²C. In a second inventive arrangement horizontal deflection power supply 450 is controlled to generate supply voltage B+ with a value sufficient produce a predetermined maximum deflection current in deflection yoke Hdy. The predetermined maximum deflection current represents the current necessary to deflect the horizontal raster component and substantially fill the tube face. Since the retrace duration is advantageously varied, for example in excess of 300% for the range of different TV standards, a feed back loop is employed where a peak value of horizontal deflection current Ih is sensed by resistor R and a control voltage B+Ctrl is formed and coupled to control B+ power supply 450. In this way displayed images having different scanning standards are presented without blanking bands, with the correct aspect ratio and with images that fill the tube face.

A plurality of different scanning standards can be manually selected and asserted by controller 405. For example, the inventive display arrangement is selectably operable to display the following formats, line doubled NTSC, line doubled PAL, 720 progressive 50 Hz, 720 progressive 60 Hz, 1080 interlaced 60 Hz and 1080 interlaced 50 Hz. In response to the selected display signal format, controller 405 communicates with sync generator 410 which generates from a crystal oscillator reference frequency, synchronizing, blanking and drive signals appropriate to the selected format. Sync generator 410 is shown in greatly simplified form generating four output signals. A pincushion correction signal E/W is supplied to forward power converter 450 to modulate the B+ voltage supplied to the horizontal output transistor to provide, as is well known, vertical rate raster width correction. Horizontal blanking and a vertical saw signal are supplied to a horizontal output transistor HOT and vertical amplifier 480 respectively. The vertical rate saw or ramp signal is amplified by vertical amplifier 480 and coupled to vertical deflection coil Vdy mounted on the cathode ray tube.

A horizontal output transistor HOT operates in conventional manner with power B+ provided by a switch mode forward power converter 450. Power converter 450 can include, for example, a pulse width modulated switching power supply integrated circuit, such as type UCC2801, which drives a semiconductor switch to form a forward power converter. The B+ power supply from power converter 450 is coupled to the collector of horizontal output transistor HOT via an inductor T1. The horizontal output transistor collector is connected to a horizontal deflection yoke Hdy mounted on the cathode ray tube. Horizontal deflection current Ih from yoke Hdy is coupled via a linearity correction circuit and an advantageous switched, standard specific S correction selection network 427. The deflection current Ih is AC coupled by capacitor C to form a deflection voltage Vh across resistor R. The deflection voltage Vh is buffered and amplified by an integrated circuit operational amplifier and peak detector 470, the operation of which is well known. The amplified and peak detected deflection voltage forms a control voltage B+Ctr which is coupled to control the B+ voltage generated by forward power converter 450.

The collector of horizontal output transistor HOT is also coupled to ground via a retrace capacitor Crt which, in conjunction with horizontal deflection yoke Hdy forms a resonant circuit that largely determines the horizontal deflection retrace time. In an inventive arrangement additional retrace capacitors Cr1, Cr2 and Crn are selectably switched by switches Sw1, Sw2 and Swn between the output transistor HOT collector and ground to provide different retrace times in accordance with each selected television standard. Control and operational data from controller 405 is communicated within display 400 via a bi-directional control bus employing, for example, an I²C protocol. Standards specific data is decoded from data bus I²C by demultiplexer 425 which forms outputs, 1, 2 and n that control switches Sw1, Sw2 and Swn. Switches Sw1, Sw2 and Swn select various different capacitors and or combinations of these capacitors to provide different retrace times specific to each scanning standard. Thus the undesirable blanking bar Blk is advantageously eliminated from the display by controlling retrace duration in accordance with the selected operational scanning standard.

As has been described with respect to the exemplary figures, the displayed picture width formed with the lower horizontal frequency standard is advantageously increased in display width by controlling the supply voltage coupled to the horizontal output stage. Supply voltage B+ is controlled in response to peak deflection current to generate a predetermined maximum deflection current which provides beam deflection over the full tube width. The deflection current Ih is AC coupled by capacitor C to form a deflection voltage Vh across resistor R. The deflection voltage Vh is buffered and amplified by an integrated circuit operational amplifier and peak detector 470, the operation of which is well known. The amplified and peak detected deflection current forms a control voltage B+Ctr for coupling to control the voltage generated by forward power converter 450.

Inventive arrangements have been described which allow a television display to operate at a plurality of high definition scanning standards and display images that fill the screen, are without significant geometric distortion and bands of blank video.

What is claimed is:

1. An image display operable with video signals having a plurality of scanning frequencies, comprising:
    a cathode ray tube for the display of ones of said video signals;

a deflection coil mounted on said cathode ray tube;

a horizontal deflection amplifier coupled to said deflection coil and generating a deflection current therein; and a plurality of retrace capacitors controllably coupled to said horizontal deflection amplifier responsive to a selected scanning frequency, to maintain a substantially constant active picture display area with said ones of said video signals having said plurality of scanning frequencies.

2. The display of claim 1, wherein said plurality of retrace capacitors are controllably coupled responsive to a data bus command representative of a scanning frequency.

3. A video display having a cathode ray tube and operable at a plurality of scanning frequencies, comprising:

a deflection arrangement forming a raster of substantially constant width on said cathode ray tube when operating at ones of said plurality of scanning frequencies;

a power supply coupled to said deflection arrangement and controlled to maintain a substantially similar deflection current generated by said deflection arrangement when operating at said ones of said plurality of scanning frequencies.

4. A method for raster scanned display of images having a plurality of scanning frequencies, comprising:

selecting a retrace time for said raster scanning in accordance with each one of said plurality of scanning frequencies; and, maintaining a substantially constant active picture width on said display for images having ones of said plurality of scanning frequencies.

5. A method for raster scanned display of images having a plurality of scanning frequencies, comprising:

selecting retrace time for said raster scanning in accordance with each one of said plurality of scanning frequencies; and, controlling deflection current for said raster scanned display to be subtantially equal in each said one of said plurality of scanning frequencies.

6. A method for cathode ray tube display of images having a plurality of scanning frequencies, comprising:

selecting a retrace time in accordance with each one of said plurality of scanning frequencies;

controlling deflection current to be substantially equal in each said one of said plurality of scanning frequencies; and, maintaining a substantially constant active picture width for images having ones of said plurality of scanning frequencies.

7. A video display having a cathode ray tube and operable to display images having identical active image pixel counts and a plurality of scanning frequencies, comprising:

a deflection arrangement forming a raster to display said active image pixels on said cathode ray tube;

a power supply for said deflection arrangement controlled to vary in a manner which facilitates the display of substantially all said active image pixels with a substantially similar picture width when operating at different ones of said plurality of scanning frequencies.

* * * * *